(12) United States Patent
Rolack

(10) Patent No.: US 6,273,597 B1
(45) Date of Patent: Aug. 14, 2001

(54) ROADSIDE WARNING SIGN SYSTEM

(76) Inventor: William Rolack, 64 Locust Dr., Amityville, NY (US) 11701

(*) Notice: Subject to any disclaimer, the term of this patent is extended or adjusted under 35 U.S.C. 154(b) by 0 days.

(21) Appl. No.: 09/545,900

(22) Filed: Apr. 8, 2000

(51) Int. Cl.[7] .......................... B60Q 1/52; F21V 21/092
(52) U.S. Cl. .................. 362/542; 362/397; 362/493; 362/546; 362/549; 362/812; 40/592; 40/597; 40/556; 40/572; 340/471
(58) Field of Search .................. 362/397, 479, 362/486, 493, 540, 542, 546, 549, 812; 40/556, 572, 575, 591, 592, 597; 340/471, 472, 473

(56) References Cited

U.S. PATENT DOCUMENTS

| | | | |
|---|---|---|---|
| 1,481,703 | * | 1/1924 | Forbes et al. ................ 40/591 |
| 2,538,854 | * | 1/1951 | Wyatt .......................... 362/540 |
| 2,559,163 | * | 7/1951 | MacDonald ................. 40/592 |
| 3,274,548 | | 9/1966 | Brimsek ...................... 340/473 |
| 3,800,430 | * | 4/1974 | Samra ......................... 340/472 |
| 3,810,092 | | 5/1974 | Tucker ......................... 340/473 |
| 3,924,344 | * | 12/1975 | Davis ........................... 40/592 |
| 4,328,481 | | 5/1982 | Sexton ......................... 340/331 |
| 4,805,324 | * | 2/1989 | Anderson ...................... 40/575 |
| 4,922,223 | | 5/1990 | Prevot ......................... 340/473 |
| 5,171,083 | * | 12/1992 | Rich ............................. 362/493 |
| 5,918,397 | * | 7/1999 | Elmer ........................... 40/592 |

* cited by examiner

Primary Examiner—Alan Cariaso
(74) Attorney, Agent, or Firm—Goldstein Law Offices P.C.

(57) ABSTRACT

A roadside warning sign system including sign support comprised of a housing having a top wall, a bottom wall, opposed side walls, an open front face, and an open back face. The housing has a light source disposed interiorly thereof. The light source has a power source. A plurality of signs are provided that are each couplable with the open front and rear faces of the housing of the sign support. The signs each have indicia thereon corresponding with vehicle problems or hazardous conditions. The signs are translucent. A base portion is provided that is adapted for coupling with a roof of a vehicle. The base portion is comprised of a lower horizontal member having an upper surface and a lower surface. The base portion includes a pair of side brackets extending upwardly from the upper surface of the lower horizontal member. The side brackets secure the sign support to the base portion.

6 Claims, 2 Drawing Sheets

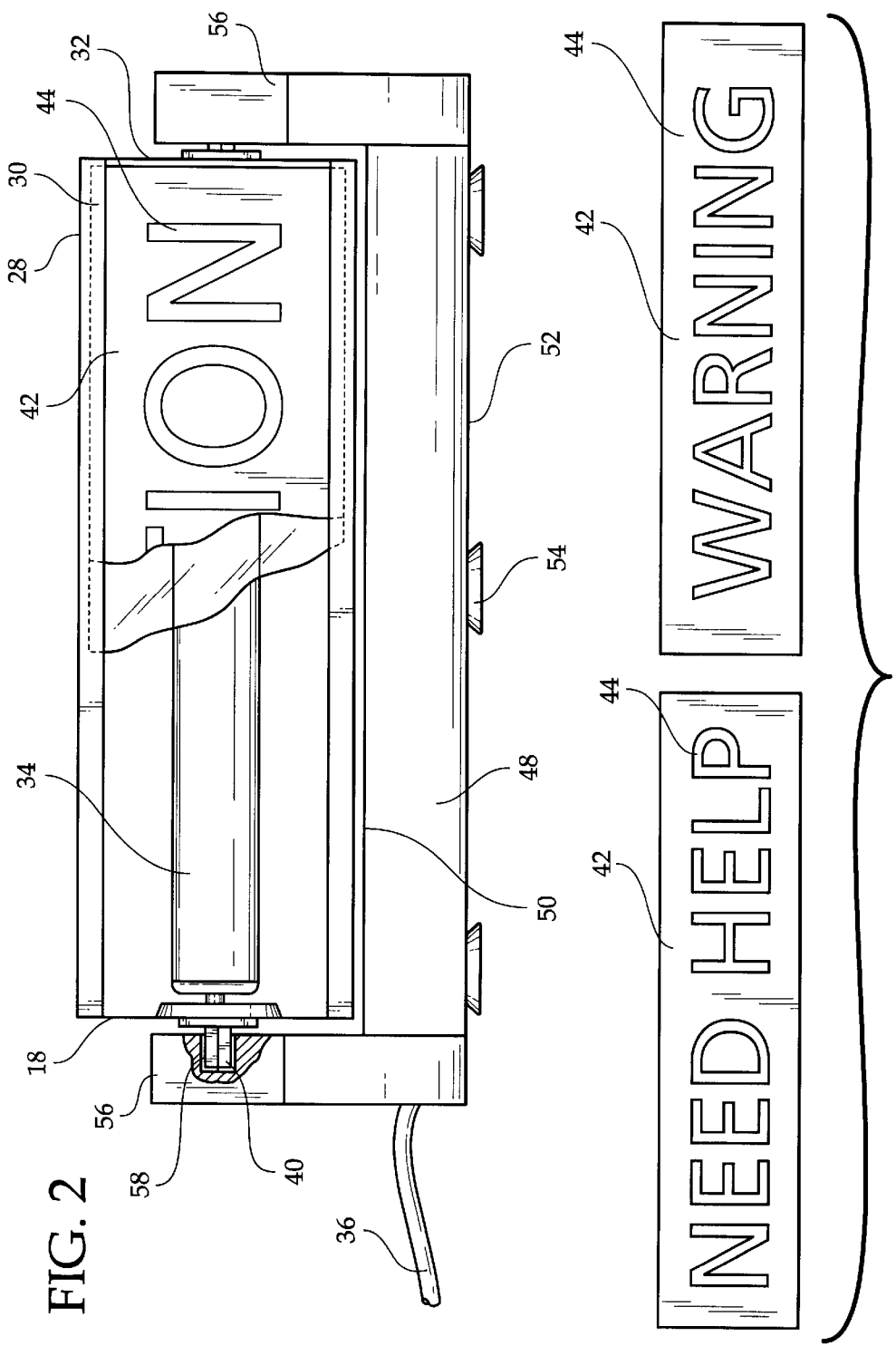

ROADSIDE WARNING SIGN SYSTEM

BACKGROUND OF THE INVENTION

The present invention relates to a roadside warning sign system and more particularly pertains to alerting passing motorists and emergency vehicles of a potential hazard or the need for assistance.

The use of signaling devices is known in the prior art. More specifically, signaling devices heretofore devised and utilized for the purpose of providing warning signals are known to consist basically of familiar, expected and obvious structural configurations, notwithstanding the myriad of designs encompassed by the crowded prior art which have been developed for the fulfillment of countless objectives and requirements.

By way of example, U.S. Pat. No. 3,810,092 to Tucker discloses a warning signal device, mountable to the roof of a disabled vehicle, by suction cups and having a variety of attachable message cards. U.S. Pat. No. 3,274,548 to Brimsek discloses an illuminated signal device powered by the cigarette lighter, for indicating that a vehicle has become disabled. U.S. Pat. No. 4,922,223 to Prevot discloses an additional highway emergency sign mounted on a stand. U.S. Pat. No. 4,328,481 to Sexton discloses a signaling device.

While these devices fulfill their respective, particular objective and requirements, the aforementioned patents do not describe a roadside warning sign system for alerting passing motorists and emergency vehicles of a potential hazard or the need for assistance.

In this respect, the roadside warning sign system according to the present invention substantially departs from the conventional concepts and designs of the prior art, and in doing so provides an apparatus primarily developed for the purpose of alerting passing motorists and emergency vehicles of a potential hazard or the need for assistance.

Therefore, it can be appreciated that there exists a continuing need for a new and improved roadside warning sign system which can be used for alerting passing motorists and emergency vehicles of a potential hazard or the need for assistance. In this regard, the present invention substantially fulfills this need.

SUMMARY OF THE INVENTION

In the view of the foregoing disadvantages inherent in the known types of signaling devices now present in the prior art, the present invention provides an improved roadside warning sign system. As such, the general purpose of the present invention, which will be described subsequently in greater detail, is to provide a new and improved roadside warning sign system which has all the advantages of the prior art and none of the disadvantages.

To attain this, the present invention essentially comprises a sign support comprised of a housing having a generally rectangular configuration. The housing has a top wall, a bottom wall, opposed side walls, an open front face, and an open back face. The open front face and the open rear face each have upper and lower support brackets secured thereto. The support brackets have an L-shaped cross-section defined by a horizontal upper segment and a downwardly extending vertical lower segment. The upper and lower support brackets form a support channel. The housing has a light source disposed interiorly thereof. The light source has a power cord extending outwardly therefrom with an adapter disposed thereon. The adapter is couplable with a cigarette adapter. The opposed side walls of the housing each have a generally diamond-shaped protrusion extending outwardly therefrom. A plurality of signs are provided that are each couplable with the support channels of the open front and rear faces of the housing of the sign support. Each of the signs has a rectangular configuration. The signs each have indicia thereon corresponding with vehicle problems or hazardous conditions. The signs are translucent. A base portion is provided that is adapted for coupling with a roof of a vehicle. The base portion is comprised of a lower horizontal member having an upper surface and a lower surface. The lower surface has a plurality of suctions cups disposed thereon for engaging the roof of the vehicle. The base portion includes a pair of side brackets extending upwardly from the upper surface of the lower horizontal member. The side brackets each have a generally diamond-shaped aperture therethrough whereby the generally diamond-shaped protrusions of the sign support can be extended therethrough for securing the sign support to the base portion.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved roadside warning sign system which has all the advantages of the prior art signaling devices and none of the disadvantages.

It is another object of the present invention to provide a new and improved roadside warning sign system which may be easily and efficiently manufactured and marketed.

It is a further object of the present invention to provide a new and improved roadside warning sign system which is of durable and reliable construction.

An even further object of the present invention is to provide a new and improved roadside warning sign system which is susceptible of a low cost of manufacture with regard to both materials and labor, and which accordingly is then susceptible of low prices of sale to the consuming public, thereby making such a roadside warning sign system economically available to the buying public.

Even still another object of the present invention is to provide a new and improved roadside warning sign system for alerting passing motorists and emergency vehicles of a potential hazard or the need for assistance.

Lastly, it is an object of the present invention to provide a new and improved roadside warning sign system including a sign support comprised of a housing having a top wall, a bottom wall, opposed side walls, an open front face, and an open back face. The housing has a light source disposed interiorly thereof. The light source has a power source. A plurality of signs are provided that are each couplable with the open front and rear faces of the housing of the sign support. The signs each have indicia thereon corresponding with vehicle problems or hazardous conditions. The signs are translucent. A base portion is provided that is adapted for coupling with a roof of a vehicle. The base portion is comprised of a lower horizontal member having an upper surface and a lower surface. The base portion includes a pair of side brackets extending upwardly from the upper surface of the lower horizontal member. The side brackets secure the sign support to the base portion.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 2 is a front view of the present invention illustrating a light source thereof.

FIG. 3 is a front view of the plurality of signs of the present invention.

The same reference numerals refer to the same parts through the various figures.

DESCRIPTION OF THE PREFERRED EMBODIMENT

Figure 1:
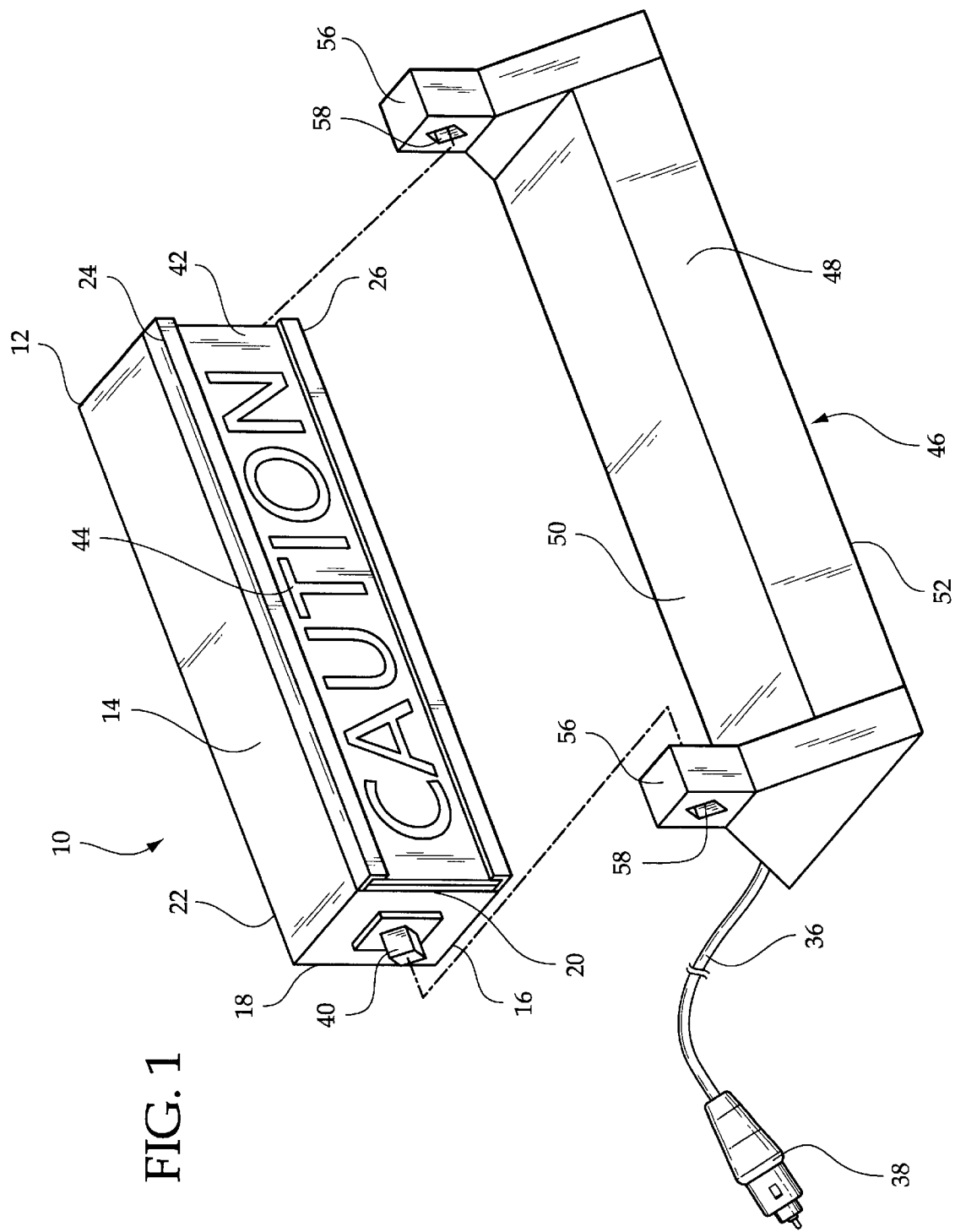
FIG. 1 is a perspective view of the preferred embodiment of the roadside warning sign system constructed in accordance with the principles of the present invention.

With reference now to the drawings, and in particular, to FIGS. 1 through 3 thereof, the preferred embodiment of the new and improved roadside warning sign system embodying the principles and concepts of the present invention and generally designated by the reference number 10 will be described.

Specifically, it will be noted in the various Figures that the device relates to a roadside warning sign system for alerting passing motorists and emergency vehicles of a potential hazard or the need for assistance. In its broadest context, the device consists of a sign support, a plurality of signs, and a base portion. Such components are individually configured and correlated with respect to each other so as to attain the desired objective.

The sign support is comprised of a housing 12 having a generally rectangular configuration. The housing 12 has a top wall 14, a bottom wall 16, opposed side walls 18, an open front face 20, and an open back face 22. The open front face 20 and the open back face 22 each have upper and lower support brackets 24,26 secured thereto. The support brackets 24,26 have an L-shaped cross-section defined by a horizontal upper segment 28 and a downwardly extending vertical lower segment 30. The upper and lower support brackets 24,26 form a support channel 32. The housing 12 has a light source 34 disposed interiorly thereof. The light source 34 has a power cord 36 extending outwardly therefrom with an adapter 38 disposed thereon. The adapter 38 is couplable with a cigarette adapter. Alternately, the light source 34 could be provided with it's own source of power, such as a battery or the like. The light source 34 could also be equipped with a blinker circuit so as to call more attention to a problematic situation when utilizing the present invention. The opposed side walls 18 of the housing 12 each have a generally diamond-shaped protrusion 40 extending outwardly therefrom.

The plurality of signs 42 are each couplable with the support channels 32 of the open front and rear faces 18,20 of the housing 12 of the sign support. Each of the signs 42 has a rectangular configuration. The signs 42 each have indicia 44 thereon corresponding with vehicle problems or hazardous conditions. Examples of the indicia 44 on the signs is illustrated in FIGS. 1 and 3. These signs are merely illustrative of the myriad of different warnings that could be utilized. The signs 42 are translucent so as to allow the light source 34 to shine therethrough for easy viewing by passing motorists or the like.

The base portion 46 is adapted for coupling with a roof of a vehicle. The base portion 46 is comprised of a lower horizontal member 48 having an upper surface 50 and a lower surface 52. The lower surface 52 has a plurality of suction cups 54 disposed thereon for engaging the roof of the vehicle. The base portion 46 includes a pair of side brackets 56 extending upwardly from the upper surface 50 of the lower horizontal member 48. The side brackets 56 each have a generally diamond-shaped aperture 58 therethrough whereby the generally diamond-shaped protrusions 40 of the sign support can be extended therethrough for securing the sign support to the base portion 46.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modification and changes will readily occur to those skilled in the art, it is not desired to limit the invention to the exact construction and operation shown and described, and accordingly, all suitable modification and equivalents may be resorted to, falling within the scope of the invention.

What is claimed as being new and desired to be protected by Letters Patent of the United States is as follows:

1. A roadside warning sign system for alerting passing motorists and emergency vehicles of a potential hazard or the need for assistance comprising, in combination:

a sign support comprised of a housing having a generally rectangular configuration, the housing having a top wall, a bottom wall, opposed side walls, an open front face, and an open back face, the open front face and the open rear face each having upper and lower support brackets secured thereto, the support brackets having an L-shaped cross-section defined by a horizontal upper segment and a downwardly extending vertical lower segment, the upper and lower support brackets forming a support channel, the housing having a light source disposed interiorly thereof, the light source having a power cord extending outwardly therefrom with an adapter disposed thereon, the adapter being couplable with a cigarette adapter, the opposed side walls of the housing each having a generally diamond-shaped protrusion extending outwardly therefrom;

a plurality of signs each being couplable with the support channels of the open front and rear faces of the housing of the sign support, each of the signs having a rectangular configuration, the signs each having indicia thereon corresponding with vehicle problems or hazardous conditions, the signs each being translucent;

a base portion adapted for coupling with a roof of a vehicle, the base portion being comprised of a lower horizontal member having an upper surface and a lower surface, the lower surface having a plurality of suctions cups disposed thereon for engaging the roof of the vehicle, the base portion including a pair of side brackets extending upwardly from the upper surface of the lower horizontal member, the side brackets each having a to generally diamond-shaped aperture therethrough whereby the generally diamond-shaped protrusions of the sign support can be extended therethrough for securing the sign support to the base portion.

2. A roadside warning sign system for alerting passing motorists and emergency vehicles of a potential hazard or the need for assistance comprising, in combination:

a sign support comprised of a housing having a top wall, a bottom wall, opposed side walls, an open front face, and an open back face, the housing having a light source disposed interiorly thereof, the light source having a power source;

a plurality of signs each being couplable with the open front and rear faces of the housing of the sign support, the signs each having indicia thereon corresponding with vehicle problems or hazardous conditions, the signs each being translucent;

a base portion adapted for coupling with a roof of a vehicle, the base portion being comprised of a lower horizontal member having an upper surface and a lower surface, the base portion including a pair of side brackets extending upwardly from the upper surface of the lower horizontal member, the side brackets securing the sign support therebetween.

3. The roadside warning sign system as set forth in claim 2 wherein the open front face and the open rear face of the housing of the sign support each have upper and lower support brackets secured thereto, the support brackets having an L-shaped cross-section defined by a horizontal upper segment and a downwardly extending vertical lower segment, the upper and lower support brackets forming a support channel for receiving the signs therein.

4. The roadside warning sign system as set forth in claim 2 wherein the light source further includes a power cord extending outwardly therefrom with an adapter disposed thereon, the adapter being couplable with a cigarette adapter.

5. The roadside warning sign system as set forth in claim 2 wherein the opposed side walls of the housing each have a protrusion extending outwardly therefrom, each of the side brackets of the base portion having apertures therethrough whereby the protrusions of the sign support can be extended therethrough for securing the sign support to the base portion.

6. The roadside warning sign system as set forth in claim 2 wherein the lower surface of the lower horizontal member of the base portion has a plurality of suctions cups disposed thereon for engaging the roof of the vehicle.

\* \* \* \* \*